UNITED STATES PATENT OFFICE.

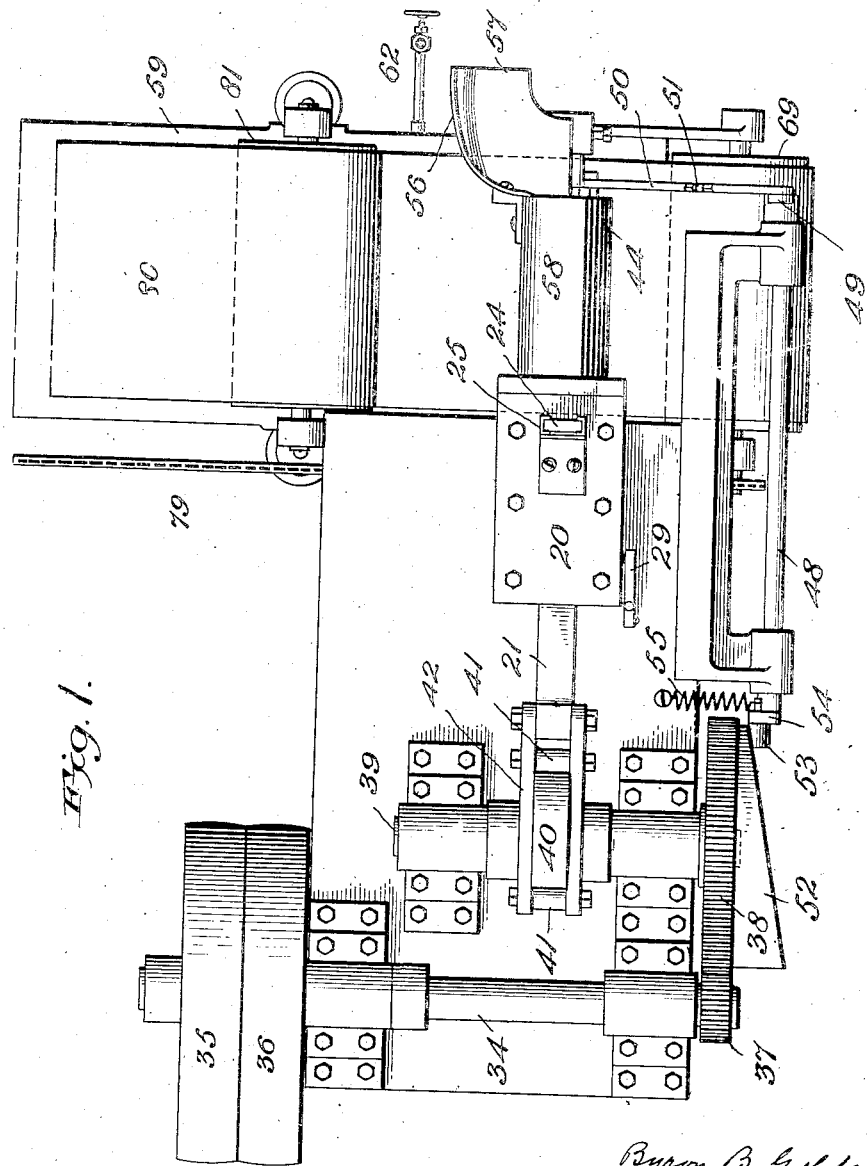

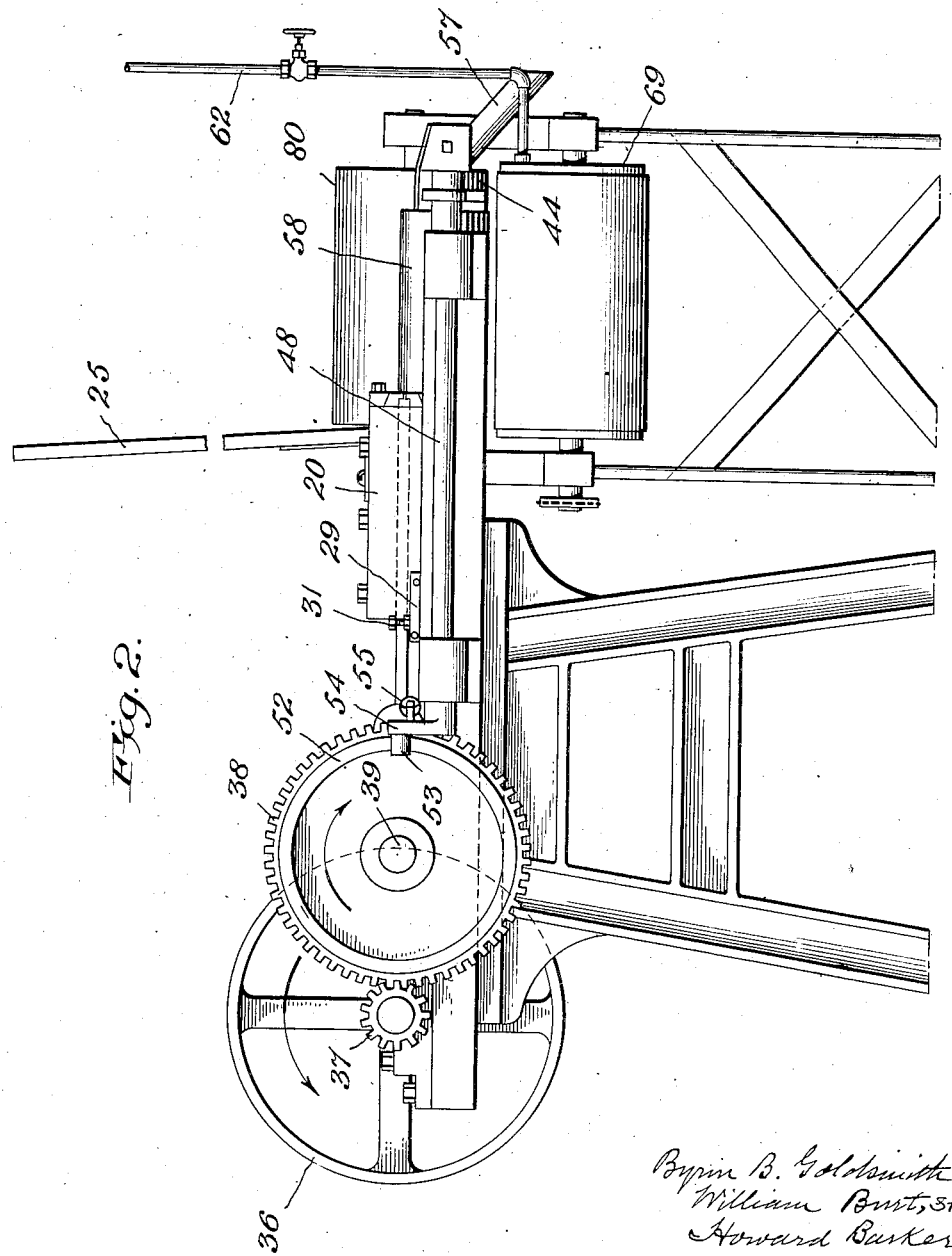

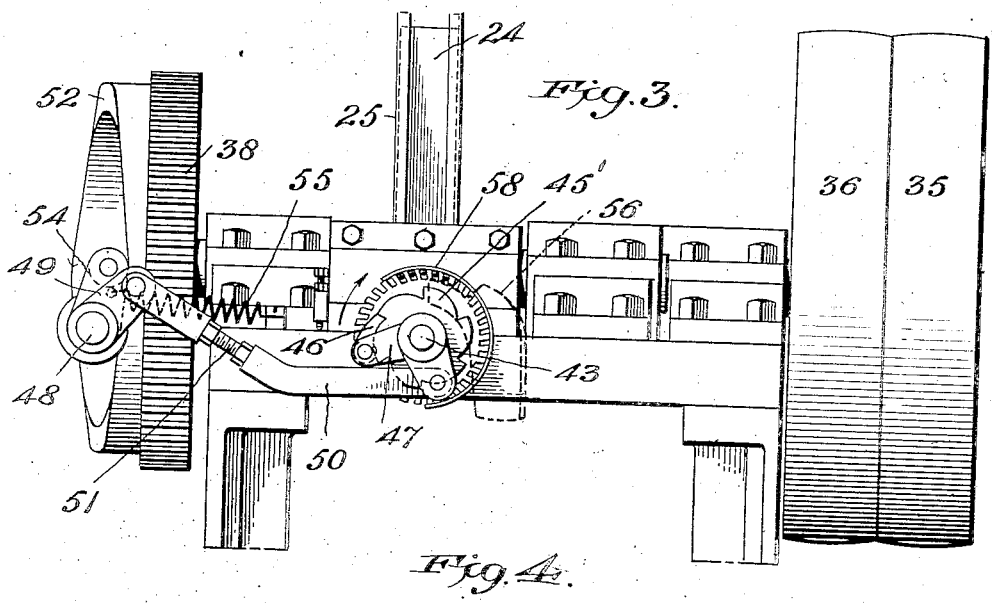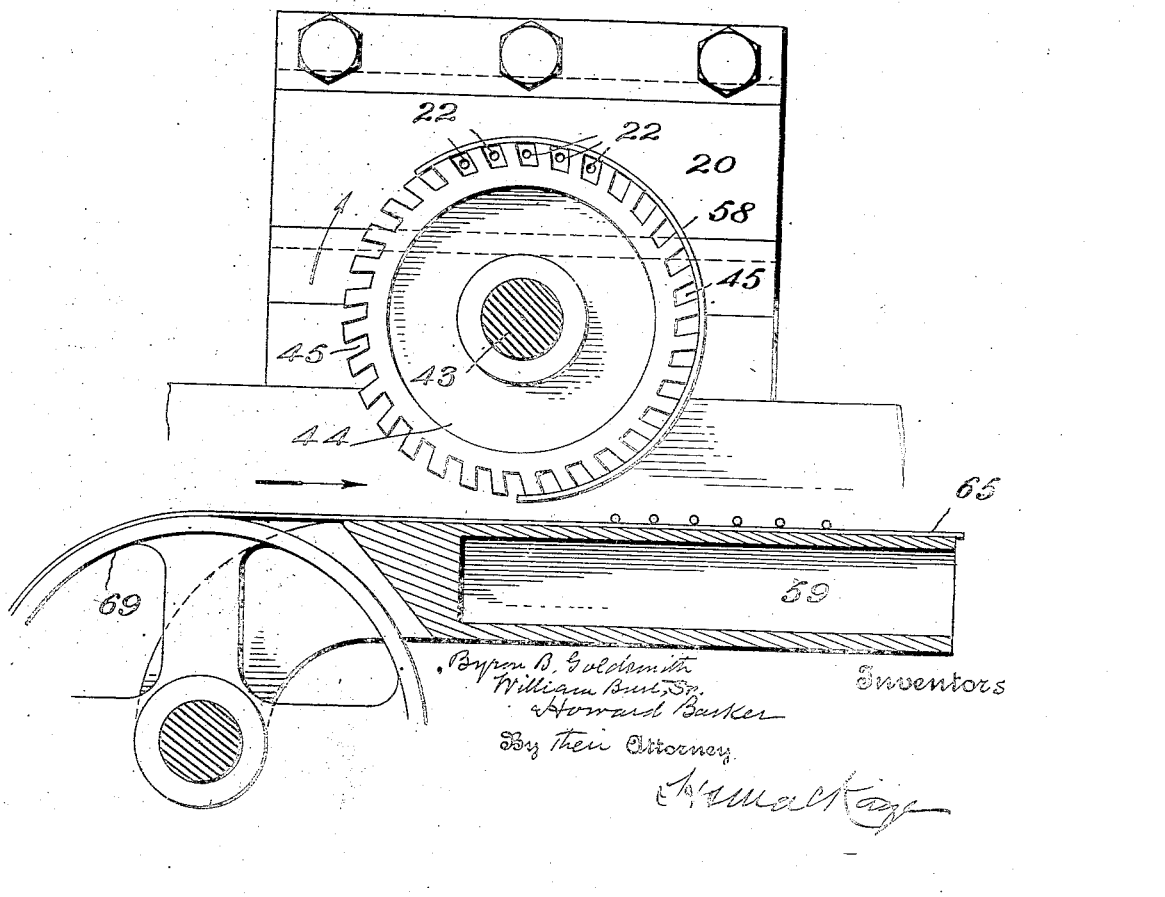

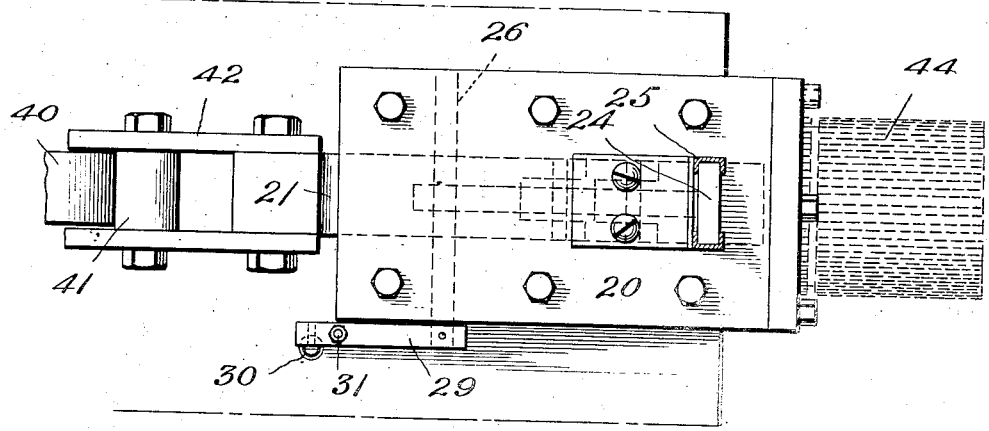
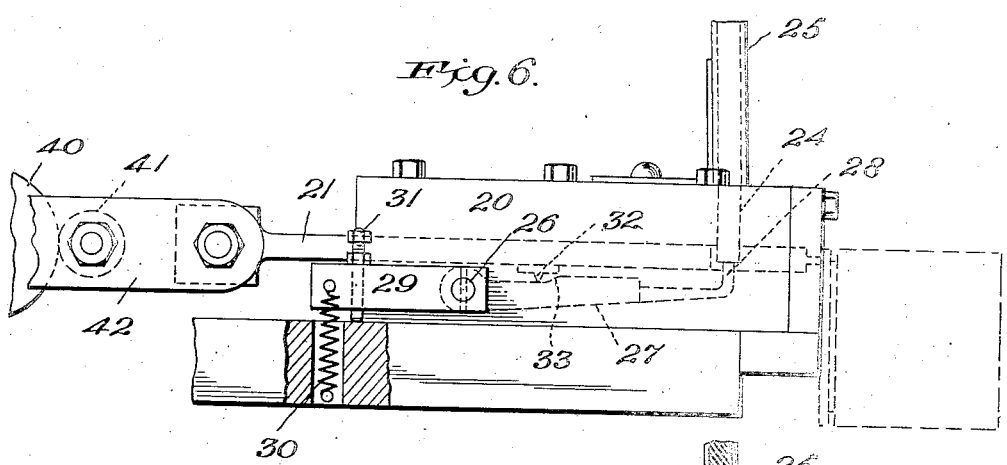
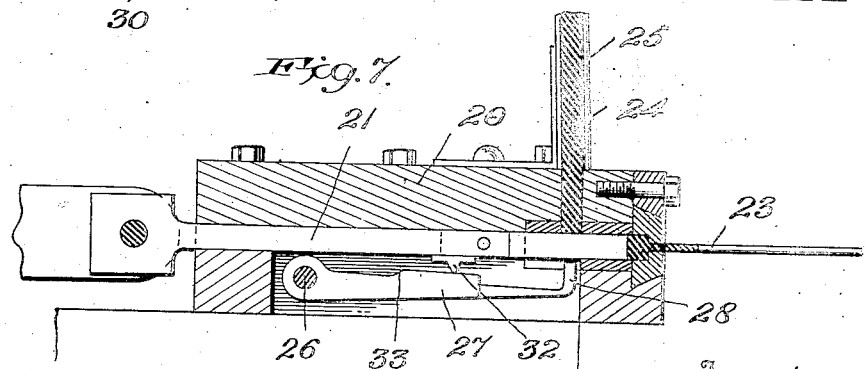

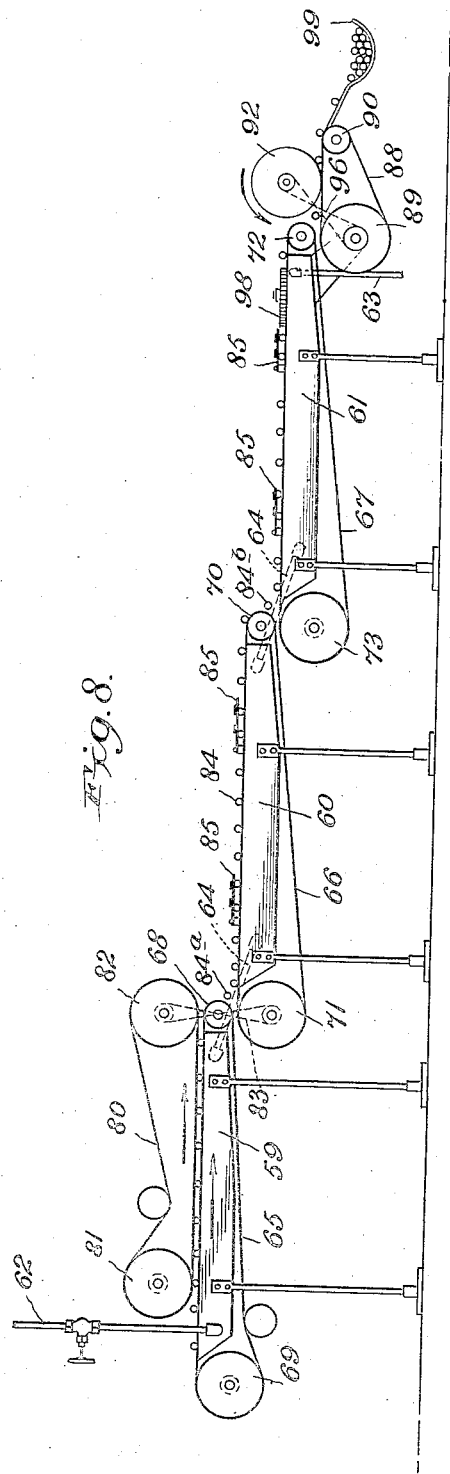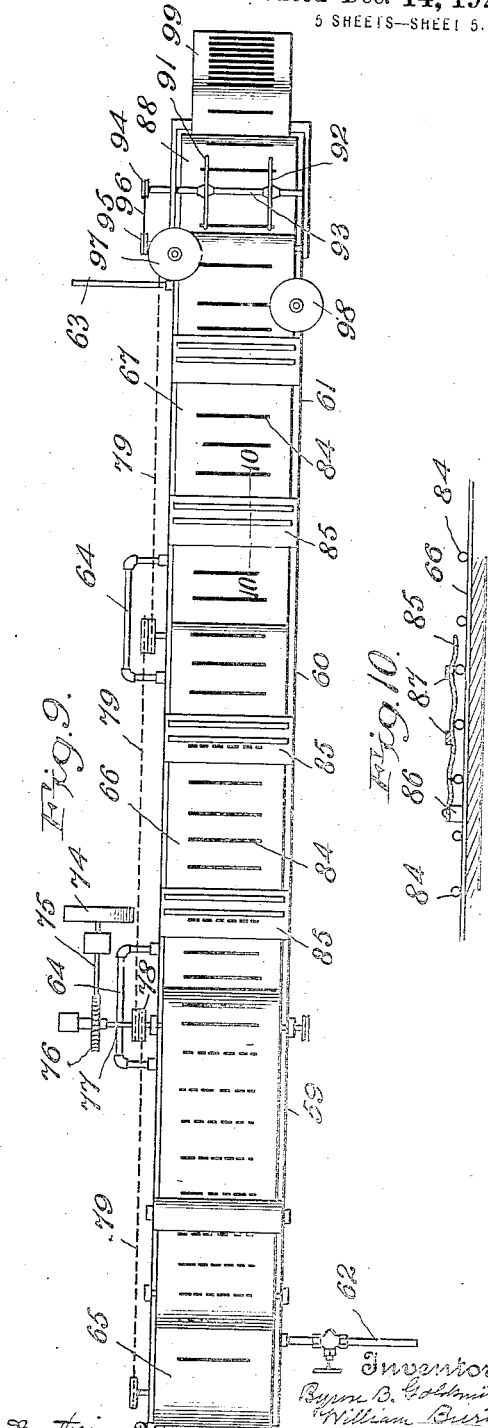

BYRON B. GOLDSMITH, OF NEW YORK, N. Y., AND WILLIAM BURT, SR., OF DELA-WANNA, AND HOWARD BARKER, OF HOBOKEN, NEW JERSEY, ASSIGNORS TO AMERICAN LEAD PENCIL COMPANY, A CORPORATION OF NEW YORK.

APPARATUS FOR MANUFACTURING RODS FROM PLASTIC MATERIAL.

1,362,095.          Specification of Letters Patent.        Patented Dec. 14, 1920.

Application filed May 2, 1916, Serial No. 232,146. Renewed January 6, 1920. Serial No. 349,812.

*To all whom it may concern:*

Be it known that we, BYRON B. GOLDSMITH, WILLIAM BURT, Sr., and HOWARD BARKER, citizens of the United States, residing at New York, N. Y., Delawanna, New Jersey, and Hoboken, New Jersey, respectively, have invented certain new and useful Improvements in Apparatus for Manufacturing Rods from Plastic Material; and we do hereby declare the following to be a full, clear, and exact description of the invention, such as will enable others skilled in the art to which it appertains to make and use same.

Our present invention relates to an improved apparatus for the manufacture of rods and tubes from plastic material, and particularly to the application of such apparatus to the art of making pencils. In the making of pencil leads, as in various related arts, it becomes necessary to convert a formless mass of plastic material such as a mixture of clay and graphite sufficiently moistened to render it plastic into straight hard rods of a definite length.

Hitherto, it has been customary to accomplish this by first squeezing the plastic material through a formative orifice in the wall of a suitable container, thereby producing a rod or strand of indefinite length which is continuously discharged from the container. In order to be able to handle this continuous strand, the operator guides it into a circular pan, and allows it to build up a circular coil until the pan is full, when another operator unwinds it, and, breaking off pieces of suitable length, lays these lengths on a board provided with grooves, into which they fit. When the board is full the lead is covered by any suitable means to keep it down in drying, and the boards are set aside to permit the leads to dry. This drying is accomplished either at ordinary temperature or by means of artificial heat in dry rooms. It takes a number of days for this lead to dry at the ordinary temperature, and about two days when artificial heat is applied. This process involves a number of obvious disadvantages which it is the object of our present invention to avoid.

One disadvantage of the process above described is that the long, continuously formed wire-like structure which is expressed from the container, being extremely plastic, forms many kinks in handling, which kinks must be broken out and reworked. In addition to this, there are many elevations and depressions formed which are hardly visible but which increase in drying and show only on the dried lead, thus making it practically impossible to get straight lead by the old method, where the strand has to be handled by the operators. Another disadvantage of the old process is due to the fact that the strand is very weak and fragile, and no matter how careful the handling, breakage not only occurs in placing the lead in the grooves, but in taking the dried lead out of them. These operations have heretofore all been done by hand, involving much time and requiring very skilled service, with the consequent high expense.

We entirely avoid all of these disadvantages, and are able greatly to reduce the time required in producing the finished product, by employment of the apparatus to which our present invention relates. At the same time the proportion of breakage is reduced to almost nothing, and the finished product is absolutely straight.

Our invention is illustrated in a preferred form in the accompanying drawings, wherein Figure 1 is a top plan view of our formative means and one end of the drier, Fig. 2 is an end elevation of our entire apparatus, Fig. 3 is a front elevation of the formative means, Fig. 4 is a similar view of a portion thereof on a larger scale, Fig. 5 is an enlarged top plan view of the compression chamber, Fig. 6 is a side elevation of the same with the plunger retracted, Fig. 7 is a longitudinal sectional view of the same with the plunger advanced and certain parts being shown in elevation, Fig. 8 is a virtually diagrammatic side elevation of our drying apparatus, Fig. 9 is a diagrammatic plan view of the same, and Fig. 10 is a sectional detail view on the line 10—10 of Fig. 9.

In its broadest aspect, our improved apparatus comprises the combination with means for forming lengths of plastic material, of means for receiving the same and conveying them away while drying them.

In the form illustrated, the formative apparatus comprises a compression box or chamber 20 within which the plunger 21 is adapted to reciprocate, and in the front of which is located a group of formative orifices 22 (see Fig. 4) through which the plastic material is expressed by forward movement of the plunger, as shown at 23, in Fig. 7.

The plastic material is preferably supplied to the chamber 20 progressively, and for this purpose we form a thick ribbon 24 of said material, which ribbon is fed by gravity between guides 25 located immediately over the intake opening in the top of the box 20. (See Figs. 1, 2 and 7). It is clear that, as the plunger 21 is caused to reciprocate by means preferably as hereinafter described, the ribbon 24 will fall down in front of said plunger on occurrence of each backward movement, while each forward movement will remove a portion from the lower end of the ribbon and force it out through the formative apertures 22.

We find it expedient to regulate the lengths of the wire-like portions 23 produced upon each double movement of the plunger 21 by controlling the extent to which the ribbon 24 is allowed to fall, on each operation, and thereby controlling the amount of material punched or sheared off by the plunger. The maximum amount will of course correspond to movement downward of the ribbon to an extent equal to the vertical diameter of the plunger, but the amount sheared off may be reduced to any desired extent below this maximum by arresting the advance of the ribbon at a suitable point above the point corresponding to the maximum drop. In order to accomplish this adjustably and automatically, and at the same time without interfering with efficient action of the plunger, we prefer to employ the means illustrated, which may be described as follows.

Just below the plunger 21 and within the box 20, there is mounted a transverse rocking shaft 26, and fast to this is the supporting lever 27, extending forward to a point immediately under the ribbon 24, where its extremity is turned upward, as shown at 28, so that the ribbon 24 as it falls will be received upon the tip of said upturned portion. (See the dotted lines in Fig. 6.) The shaft 26 extends a short distance outside of the box 20, where it is furnished with a backwardly-extending arm or lever 29, to the extremity of which is attached a tension spring 30, or equivalent means, which tends constantly to lift the end 28 of the supporting lever. This spring is powerful enough to arrest the downward movement of the plastic ribbon 24, and the extent to which it is permitted to lift the end 28 is made adjustable by use of a set screw 31, the operation of which is obvious.

The means so far described will operate to arrest each downward drop of the ribbon 24 at any desired point within limits, but it is clear that, since the upturned end 28 which receives the ribbon 24 extends into the path of movement of the plunger 21, means must be provided whereby this end is automatically withdrawn as the plunger advances, and after the ribbon has been secured in its arrested position. It is to be understood that the term "ribbon" includes any suitably pre-formed blank, capable of use in the manner described herein.

For this purpose we employ a projection 32, fastened beneath the plunger 21, and we shape the upper surface of the lever 27 so as to form a cam surface coöperating with this projection to lower the point 28 at the proper time. As shown in dotted lines in Fig. 6, when the plunger 21 is retracted, the projection 32 permits the lever 27 to rise and arrest the plastic ribbon 24, holding it so arrested while the plunger moves forward. Just as the forwardly moving plunger comes in contact with the ribbon 24, and presses upon it with sufficient force to prevent its slipping downward, the projection 32 reaches the upward curve 33 on the top of the lever 27; and, as the plunger continues moving forward and shears off plastic material which is squeezed out at 22, the projection 32 acts upon the curve 33 to tilt the lever 27 and thus lower the arresting tip 28 into the position shown in Fig. 7.

The movement of the plunger 21 may be produced by a variety of forms of apparatus. In the preferred form shown we employ a main driving shaft 34, having the usual fast and loose pulleys 35, 36, and acting through the gears 37, 38, to drive a countershaft 39. This countershaft carries a cam 40, acting upon suitable abutments 41 on a frame 42, attached to the plunger 21; and this cam acts in a well understood manner to impart reciprocating movement to said plunger.

In order that the material pressed out by the plunger may be severed into appropriate lengths and may be suitably placed in order upon the conveyer and drier hereinafter described, we prefer to employ the following transferring means. From the front of the machine a little below the orifices 22 there projects a stub shaft or cylindrical bearing 43, upon which is carried and adapted to rotate the depositing cylinder 44. As best shown in Figs. 3 and 4, this cylinder is provided with longitudinal peripheral grooves 45, so placed that, as the cylinder is revolved, these grooves register in groups of five with the five formative orifices 22. In the specific form illustrated, we have shown six groups of five grooves each, and we employ means for imparting an intermittent rotation of sixty degrees to the cylinder 44.

Clearly a different number of grooves and groups thereof could be employed without departing from our invention.

The rotating means for this cylinder comprises a ratchet wheel 45' of six teeth fixed to the outer end of the cylinder, and with this coöperates the ratchet 46 on the bell crank 47 which is mounted to turn on the stub shaft 43. The requisite rocking movement is imparted to this bell crank by the rock shaft 48, rotatably mounted on the side of the machine, and connected to the bell crank 47 by means of a crank arm 49 and a connecting rod 50. The right and left screw 51 makes it possible accurately to adjust the movements of the depositing cylinder. The rocking movement of the shaft 48 is produced by a cam 52 on the face of the gear wheel 38, which acts upon a pin or roller 53 carried by the crank arm 54 on the shaft 48, and to which arm is attached a tension spring 55 which holds the pin or roller 53 against the cam 52.

The mechanism thus far described is all so arranged, in a manner which will clearly appear from the drawings, so that, immediately after each forward movement of the plunger 21, and during its retraction, the depositing cylinder 44 will be revolved through sixty degrees to bring a new group of slots or grooves 45 into line with the orifices 22. The inner face of the cylinder 44 is placed quite close to the front of the compression box; and, as the cylinder is revolved the sharp edges of the grooves 45 shear off the plastic wires 23, thus severing measured portions thereof, forming the primitive plastic undried rods which are carried by the cylinder and deposited upon the drier and conveyer hereinafter described.

For practical reasons, we find it best to so adjust the machine that these rods are formed a little too long, so that they project slightly from the front end of the cylinder, and to cut off these projections, thus making each rod exactly the length of the cylinder. In order to cut off these projecting outer ends we prefer to supply a sharp blade 56, curved both forwardly and outwardly (see Figs. 1 and 3). The rods are carried forward by the cylinder and their outer projections are pressed against this blade, so that they are cut off and drop into the chute 57, to be collected and returned to the mass from which the ribbons 24 are made.

In order that the rods may be held within the grooves 45 until they may be deposited all at the same point and at a minimum distance from the conveyer and drier, we prefer to place a shield 58 closely around the top and front of the cylinder 44, said shield terminating at the lowest point of the cylinder. Here, as each severed rod is brought in its groove, it drops out upon the conveyer and drier. It will be noted that the limiting front and back walls of the grooves 45 are preferably inclined slightly backward. This arrangement gives a more efficient shearing action to the edges of the back walls; while the front walls, being thus inclined, will support the rods within the grooves for a longer time before allowing them to come into contact with the shield 58. This lessens the time during which the soft material is made to rub against the stationary shield.

The conveyer and drier is best shown in Figs. 1, 2, 4, 8, 9 and 10. This consists essentially of one or more (and preferably at least three) heated tables upon which the rods are deposited and over which they are conveyed in a manner to preserve their straight form. In the embodiment shown in our drawings there are employed three steam tables 59, 60 and 61, heated by steam or other heating medium, which may enter by the pipe 62 and leave by the pipe 63, passing from one table to another by the pipes 64. Other heating agencies may be used in this connection, such as electric wires, hot water, etc.

Belts 65, 66 and 67 are carried over the tables 59, 60 and 61 respectively. The belt 65 is driven by the drum 68, its opposite end passing over the drum 69. Similarly the belt 66 has the driving drum 70 and the carrier drum 71, while the belt 67 is carried by the drums 72 and 73. These belts may, of course, be driven in any convenient manner, and in Fig. 9 we have shown a main driving pulley 74 actuating a worm shaft 75 which drives a worm wheel 76 on the shaft 77. This shaft carries the drum 68 and also has a pulley 78 connected by belts or cords to similar pulleys on the shafts of certain of the other drums as shown by the dotted lines 79.

Above the first table 59 is a second or "confining" belt 80 running on rollers 81 and 82, and driven in any suitable manner, as by the crossed belt 83. This confining belt is arranged with its lower course so close to the belt 65 as to bear gently upon the plastic rods when these latter are dropped upon said belt 65 and carried forward thereby. As indicated by the two arrows over the table 59, the contiguous courses of the belts 65 and 80 run in the same direction.

The belt 66 and table 60 are placed somewhat lower than the table 59, and similarly the belt 67 and table 61 are placed a little lower than the table 60. This arrangement is adopted so that the rods indicated by the thick lines 84 in Figs. 8, 9 and 10 fall a short distance from one table to another as they are carried forward. This is shown at 84ª and 84ᵇ in Fig. 8. We have found that by this expedient we are able to correct the tendency of the rods to assume a slanting direction with respect to the line of travel, whereby they would tend to run off of the belt while being turned, as about to be described.

In the form of our machine above described, we give the plastic rods a preliminary drying by closely confining them between two belts against the first heated table. When so confined their original straight form is preserved. If desired, the rods may be slowly turned during this stage, to correct any slight distortion, by running one or the other of the belts, preferably the belt 65, a little faster than the other. This difference is very slight and is not, in any case, essential to our invention.

The rods pass from this stage of confinement to drying in the open as they are discharged upon the table 60. Here they are subjected to a rolling action (intermittent in the form shown) which rolling serves to preserve the straightness of the rods, preventing distortion from warping. In the form shown we accomplish this by providing at short intervals the friction bands or aprons 85 fixed at their forward corners close over the several belts 66 and 67 and lying loosely upon said belts. The studs 86 to which these bands are fixed are placed at the sides of the moving belts, and the rods 84 pass between them and under the bands 85, in contact with their under surfaces. We prefer to provide slats 87 fastened across the upper surfaces of the bands 85. These slats prevent wrinkling and act by their weight to depress the band in waves between successive rods. This wave-like action gives the bands a better hold on the rods and thus emphasizes the turning action exerted by the frictional retardation of the bands. The turning of the soft rods prevents distortion and keeps them perfectly straight during the drying process.

It is obvious that as many drying tables may be used as desired. The number of tables, their length, the speed of the belts and the drying temperature employed will be inter-dependent and the determination of these details will be a matter of simple engineering, depending upon the materials used and the ends in view.

The drying having been substantially completed, we prefer to discharge the rods upon a delivery belt 88 running on drums 89 and 90, suitably driven by means not shown. As the rods move forward here, the two ends of each are cut off by the knife-edged disks 91 and 92 on the shaft 93 driven in the direction of the arrow in Fig. 8, as by the pulleys 94 and 95 and the belt 96.

To insure symmetrical presentation of the rods 84 to the cutters we employ alining means, and for this purpose we have used successfully two horizontal disks, 97 and 98, turning on vertical shafts and having their peripheries preferably somewhat roughened. These rest with one side of the under surface of each upon the upper surface of the belt 67, close to its point of discharge. They are thus caused to turn by friction with the belt, and, as the rods 84 are carried past them, their ends come into contact with these disks which push them into proper position with respect to the cutting disks. When the rods have been cut, they are discharged in finished condition upon the receiver 99.

It will be seen that our machine will form and cut off the plastic rods in groups of five and convey them in strictly parallel position to a belt running on a heated table in a direction at right angles to that position. By carrying these rods a sufficient distance over heated tables, preserving their parallelism and correcting any incipient warping tendency from time to time, they are finally hardened and dried. They are then cut to the proper length desired and delivered in finished form. It is immaterial to our invention whether the rods are formed solid or hollow, and therefore the term "rods" as used in our claims covers tubes as well as solid rods.

Instead of having the belts running continuously, some advantages are gained by running them intermittently, if the pressing is done intermittently. This is particularly true of the first belt. It is also of advantage to have the belts made of some absorbent material, which assists the drying considerably, as in that way the belts continuously absorb moisture from the rods and give it off to the atmosphere.

We do not claim herein the method of drying while rotating the rods to prevent distortion, neither do we herein claim broadly the process and apparatus involved in delivering plastic rods of definite length directly from the press to the carrier. These form the subjects matter of other and copending applications for Letters Patent.

Various changes may be made in the mechanism herein set forth without departing from our invention, and we do not limit ourselves to the details herein shown and described.

What we claim is—

1. In apparatus of the class described, means for forming plastic rods, a carrier for receiving said rods as formed, means for moving said carrier progressively past said forming means, and means adapted to dry said rods while in progressive movement on said carrier.

2. The combination generally set forth in claim 1 hereof, wherein heating means are applied to the rods for drying them.

3. In apparatus of the class described, means for forming plastic rods, means adapted to impart intermittent operative movement thereto, a moving carrier for receiving said rods and means adapted to operate along the path of movement of said carrier for drying said rods.

4. The apparatus set forth generally in claim 3 hereof, in combination with automatic severing means adapted to sever the rods in front of said forming means in the intervals between the intermittent movements of the same.

5. The apparatus set forth generally in claim 1 hereof, in combination with means for causing axial rotation of the rods while being dried upon the carrier.

6. The apparatus set forth generally in claim 1 hereof, wherein the carrier comprises a series of elements on successively lower levels, whereby the rods while drying are caused to drop from one carrier element to the next.

7. The apparatus set forth generally in claim 1 hereof, in combination with means at a point remote from the forming means adapted to cut off the ends of the rods.

8. The elements set forth generally in claim 1 hereof in combination with means at the beginning of the series adapted to cut off the ends of the rods.

9. In apparatus of the class described, forming means for producing plastic rods, a carrier for conveying the same away, and transferring means adapted to receive the rods from the forming means and deposit them upon the carrier.

10. The combination generally set forth in claim 9 hereof, wherein the transferring means is a grooved member associated with means for rotating the same just above the carrier.

11. The elements generally set forth in claim 9 hereof in combination with means for producing intermittent action of the forming and transferring means and for producing movement of the carrier.

12. The combination generally set forth in claim 9 hereof, wherein the transferring means is adapted to sever the plastic material.

13. The combination generally set forth in claim 9 hereof wherein the forming means is adapted to express the plastic material through formative orifices and wherein the carrier is adapted to move at right angles to the direction in which the plastic material is expressed.

14. In apparatus of the class described, a rod-forming press having a suitable forming orifice, a transferring means having a groove adapted to be brought opposite said orifice to receive the rods when formed, and a carrier adapted to receive the rods from said transferring means.

15. In apparatus of the class described, a press having a suitable formative orifice, a rotary transferring device adapted to turn on a center below said orifice and having a groove adapted to register therewith, and a carrier beneath said transferring device.

16. In apparatus of the class described, a press having a suitable formative orifice, a rotary transferring device adapted to turn on a center below said orifice and having longitudinal grooves around its periphery adapted to be brought into successive registry with said orifice, and a carrier beneath said transferring device.

17. The combination generally set forth in claim 13 hereof, wherein the forming device has a plurality of orifices and wherein the transferring device has a number of groups of receiving grooves, each group comprising as many grooves as there are orifices.

18. The combination generally set forth in claim 9 hereof, wherein the transferring means comprises a peripherally grooved cylinder and a shield embracing a portion of the periphery thereof.

19. A transferring device for the purpose described comprising a peripherally grooved cylinder, the edges of the grooves at one end being adapted to act as severing or shearing means.

20. The combination generally set forth in claim 9 hereof, wherein the transferring means comprises a peripherally grooved cylinder whose grooves are bounded by walls one or both of which is inclined to the radial planes passing through such grooves.

21. A transferring device for the purpose described comprising a peripherally grooved cylinder, and a stationary curved cutting blade fixed at the outer end thereof, whereby material projecting from the grooves will be cut off as the cylinder is revolved.

22. In apparatus of the class described in claim 1 hereof, a compression box with a formative orifice in its wall, a plunger playing therein and an intake opening for plastic material in said box.

23. The apparatus set forth in claim 21 hereof in combination with an adjustable arresting device adapted to determine the movements of plastic material through said intake opening.

24. The combination generally set forth in claim 22 hereof, wherein the arresting device is adapted to be automatically withdrawn by forward movement of the plunger.

25. The combination generally set forth in claim 23 hereof wherein the arresting device comprises a tiltable lever having a curved upper surface and the plunger is provided with a projection adapted to depress the end of said lever by moving along said curve.

26. The combination generally set forth in claim 9 hereof, wherein the transferring means comprise a peripherally grooved cylinder, a ratchet wheel and ratchet mounted at one end thereof and automatic means mechanically connected with said ratchet for intermittent operation of the transferring device.

27. The apparatus set forth generally in claim 1 hereof, wherein the drier comprises a heated table, a belt adapted to move over the same, a confining belt adapted to move over the first named belt and means adapted to drive said belts so that their contiguous courses move in the same direction.

28. The apparatus set forth in claim 27 hereof wherein one of said belts is caused to move a little faster than the other.

29. The apparatus set forth in claim 27 hereof, in combination with a second drier and conveyer adapted to receive material discharged by said belts and placed upon a slightly lower level than the first drier.

30. In apparatus of the class described in claim 1 hereof, a heated table, a belt adapted to move over the same and a stationary band fixed over said belt and close thereto and adapted to act frictionally upon material carried under it by said belt.

31. The apparatus set forth in claim 30 hereof, in combination with weights fixed at intervals across said band.

32. In apparatus of the class described, a traveling belt, means for depositing plastic rods in parallel position across the same, and an alining disk for said rods adapted to rotate in a plane parallel to said belt.

33. The combination set forth generally in claim 32 hereof, wherein the alining disk has a roughened periphery.

34. The combination set forth generally in claim 32 hereof, wherein two alining disks are used on opposite sides of the belt, one disk being further advanced than the other.

35. The combination set forth generally in claim 32 hereof, wherein the alining disk is propelled by frictional contact between the face of the disk and the belt.

36. In apparatus of the class described, a drying table, a traveling belt thereon, alining disks on said belt, a second traveling belt placed to receive material from said first-named belt and a pair of disk-shaped cutters over said second belt.

37. In apparatus of the class described, means for forming plastic rods in combination with a carrier adapted to receive the rods and convey them to a distance, means for heating the rods while being so conveyed and means for imparting axial rotation to the rods while on the carrier.

38. In apparatus of the class described, means for forming plastic rods in combination with means adapted to receive the rods as formed and means for imparting axial rotation to said rods while on said latter means.

39. Means for expressing moist plastic rods in combination with a drying means adapted to receive and rotate said rods.

40. In apparatus of the class described, a compression box having a formative orifice, a plunger playing therein, an intake opening for admitting a blank between the plunger and said formative orifice, and means for limiting successive movements of said blank.

41. Apparatus of the character set forth in claim 40 hereof wherein the limiting means takes the form of an arresting device adapted to be adjusted as to position whereby a variable degree of movement is imparted to the blank.

In testimony whereof we affix our signatures.

BYRON B. GOLDSMITH.
WM. BURT, Sr.
HOWARD BARKER.